United States Patent [19]
Grube et al.

[11] Patent Number: 6,005,848
[45] Date of Patent: Dec. 21, 1999

[54] METHOD AND APPARATUS FOR A TALKGROUP CALL IN A WIRELESS CDMA SYSTEM

[75] Inventors: Gary W. Grube, Barrington; Richard A. Comroe, South Barrington, both of Ill.

[73] Assignee: Motorola, Inc., Schaumburg, Ill.

[21] Appl. No.: 08/958,041

[22] Filed: Oct. 27, 1997

[51] Int. Cl.⁶ .......................... H04L 12/16; H04Q 11/00; H04B 7/216; H04B 1/04

[52] U.S. Cl. .......................... 370/266; 370/342; 370/335; 455/518

[58] Field of Search ...................................... 370/266, 267, 370/329, 335, 342, 349; 340/825.47; 455/512, 518, 519, 524

[56] References Cited

U.S. PATENT DOCUMENTS 5,506,837  4/1996  Sollner et al. ............................. 370/31

*Primary Examiner*—Douglas W. Olms
*Assistant Examiner*—David R Vincent
*Attorney, Agent, or Firm*—Christopher P. Moreno; Steven A. May

[57] ABSTRACT

In a wireless code-division multiple access (CDMA) system (100), a talkgroup (101) of subscriber units is provided. A sub-group (102) of subscriber units, forming a part of the talkgroup is assigned at least one inbound code (416–417). The entire talkgroup is assigned an outbound code (415). Members of the sub-group may simultaneously transmit voice information (410–411) using the at least one inbound code, which voice information is summed (412) and re-transmitted to the talkgroup using the outbound code. Subscriber units in the talkgroup, but not included in the sub-group, are allowed to transmit voice information only after requesting, and receiving, an additional inbound code.

19 Claims, 4 Drawing Sheets

| | 301 | 302 | 303 |
|---|---|---|---|
| | TALKGROUP | TG UNITS | DUPLEX SUBGROUP UNITS |
| | TG 001 | SU 001<br>SU 002<br>SU 003<br>SU 004<br>SU 008<br>SU 009 | SU 003, SU 008<br>SU001<br>SU 001, SU 008<br>SU 001<br>SU 001, SU 003<br>SU 001 |
| | TG 002<br>⋮ | ⋮ | ⋮ |

METHOD AND APPARATUS FOR A TALKGROUP CALL IN A WIRELESS CDMA SYSTEM

FIELD OF THE INVENTION

The present invention relates generally to wireless code-division multiple access systems and, in particular, to a method and apparatus for talkgroup calls within such systems.

BACKGROUND OF THE INVENTION

Two-way wireless communication systems incorporating group dispatch services are known in the art. Group dispatch services typically provide communications within a talkgroup. A talkgroup is a set of logically united subscriber units (e.g., in-vehicle mobile and/or hand-held portable radios) capable of engaging in group-wide communications. In normal talkgroup communications, a single subscriber unit of the talkgroup transmits voice information that is received by a fixed infrastructure and re-transmitted to the other subscriber units in the talkgroup. Typically, such systems use frequency-division multiple access (FDMA) and/or time-division multiple access (TDMA) methods to receive and rebroadcast the transmission. In FDMA systems, an inbound channel is normally paired with an outbound channel, and the inbound channel can be used by only one subscriber unit at a time. Similarly, in TDMA systems, inbound and outbound time slots are paired and only one subscriber unit at a time can transmit an inbound message for re-transmission.

While these systems provide useful group communications, they force communications to be somewhat regimented in that only one subscriber "owns" the call at any time. That is, more natural, group-style communications in which there are simultaneous multiple speakers and multiple listeners are not possible because only one subscriber unit can be transmitting at any time. Although numerous prioritization methods exist today to allow high priority users, or users originating high priority traffic (i.e., emergency calls), to be declared the owner of a talkgroup call, communications are still restricted to single speaker/multiple listener configurations.

Current telephone services provide for conference calls in which multiple speakers and multiple listeners may simultaneously participate in the call. Conference calling can be extended to current wireless systems by allocating a separate inbound channel or time slot to each potential speaker and a separate outbound channel or time slot for potential listeners. Further still, separate full duplex channels (inbound and outbound resources) could be allocated to each subscriber unit of the talkgroup. While these approaches are functional, they are highly inefficient in terms of resource usage. For example, it is not uncommon in public safety organizations to have talkgroups encompassing up to 100 subscriber units. Obviously, establishing a group conference call using separate inbound and/or outbound resources for up to 100 separate subscriber units would require communication resources beyond the capacity of most communication systems.

Thus, a need exists for duplex communications between members of a talkgroup in wireless communication systems.

DESCRIPTION OF A PREFERRED EMBODIMENT

The present invention generally provides for duplex communications within talkgroups. In a wireless code-division multiple access (CDMA) system, a sub-group of subscriber units, forming a part of a larger talkgroup of subscriber units, are assigned at least one inbound code. The entire talkgroup is assigned an outbound code. Subscriber units of the sub-group may simultaneously transmit voice information using the at least one inbound code, which voice information is summed at a fixed infrastructure and re-transmitted to the talkgroup using the outbound code. Subscriber units that are not included in the sub-group are allowed to transmit voice information only after requesting, and receiving, an additional inbound code. Through this use of code-based access, more natural, group-style communications are possible for subscriber units in wireless talkgroups without placing an undue burden on the wireless communication system.

Figure 1:
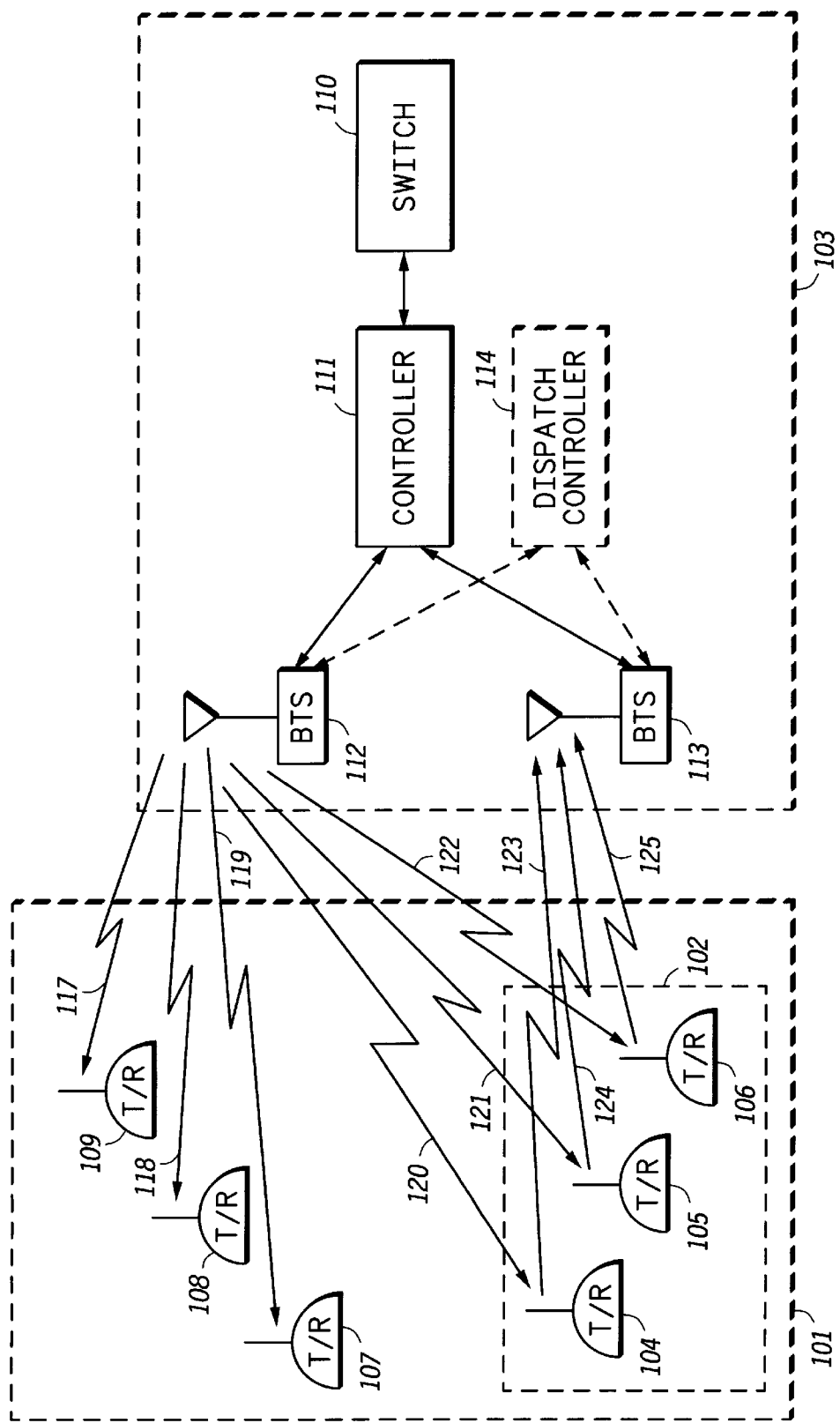
FIG. 1 is a block diagram of a wireless communication system in accordance with the present invention.

The present invention can be more fully described with reference to FIGS. 1–5. FIG. 1 is a block diagram of a wireless communication system 100 in accordance with the present invention. The wireless communication system 100 is a CDMA system, as known in the art, and comprises a plurality of subscriber units 104–109 arranged into at least one talkgroup 101 in wireless communication with a fixed infrastructure 103. The talkgroup 101 further comprises a sub-group 102. In the example shown, the subscriber units identified by reference numerals 104–106 are included in the talkgroup 101 and the subgroup 102, whereas the subscriber units identified by reference numerals 107–109 are included in the talkgroup only. In the preferred embodiment, each of the subscriber units 104–109 is physically capable of duplex communications. However, as described in further detail below, only those subscriber units included in the sub-group are logically allowed to engage in duplex communications relative to the talkgroup 101.

As known in CDMA systems, communication channels 117–125 are effectively provided through the uses of codes, often referred to as pseudorandom noise (PN) sequences. As described in further detail below, an outbound code is used to effectively provide outbound communication channels 117–122 to each subscriber unit in the talkgroup 101. Additionally, inbound codes (three used in the example illustrated in FIG. 1) are used to effectively provide inbound communication channels 123–125 to each subscriber unit in the sub-group 102.

The fixed infrastructure 103 comprises those elements normally required to support communications within the wireless system 100 and, in the preferred embodiment, conforms to a typical CDMA architecture. In particular, the fixed infrastructure 103 comprises a switch 110 in communication with a controller 111 that, in turn, is in communication with base transceiver systems (BTSs) 112–113. The switch 110 (often referred to as a Mobile Switching Center or MSC), the controller (often referred to as a Base Station Controller or BSC) 111 and the BTSs 112–113 are all well known in the art. In practice, the switch 110 typically communicates with more than one controller, and may communicate with other equipment not shown. For the purposes of simplicity, the fixed infrastructure 103 has been limited as shown in FIG. 1. The fixed infrastructure 103 may also optionally include a dispatch controller 114 in communication with the BTSs 112–113. A suitable dispatch controller 114 is the Dispatch Application Processor used in "IDEN" wireless communication systems manufactured by Motorola, Inc. The management of group call processing is preferably handled by the controller 111 or, if used, by the dispatch controller 114. Additionally, the functionality of group call handling, as described below, may be distributed throughout the fixed infrastructure 103.

Figure 2:
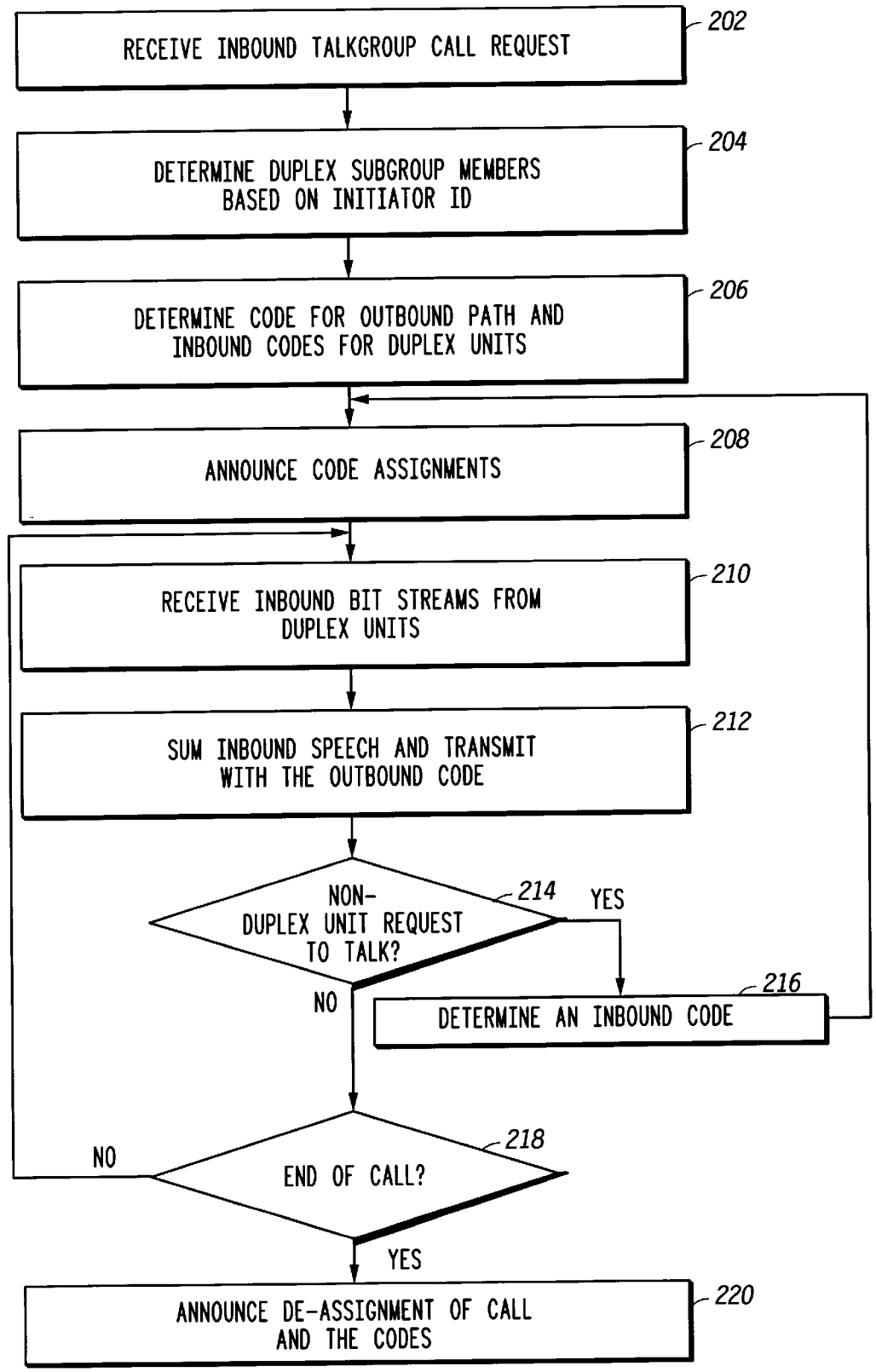
FIG. 2 is flow chart illustrating a method for use by a fixed infrastructure in accordance with the present invention.

FIG. 2 is flow chart illustrating a method for use by the fixed infrastructure 103. Although the method described in FIG. 2 is generally implemented by the fixed infrastructure 103, the method is preferably carried out by the controller 111 or by the dispatch processor 114, if used. Also, the functionality illustrated in FIG. 2 may be distributed throughout the fixed infrastructure 103. Generally, the method illustrated in FIG. 2 is implemented as stored software routines that are executed by the platforms in which the software is stored.

At step 202, the fixed infrastructure 103 receives a request for a talkgroup call from a subscriber unit of the talkgroup 101. The requesting subscriber unit may be one of the subscriber units 104–106 included in the sub-group 102, or it may be one of the subscriber units 107–109 that is not a member of the sub-group 102. Regardless, the request includes an identification of the requesting subscriber unit and an identification of the talkgroup for which communications are to be established. At step 204, the fixed infrastructure 103 determines, using a table and the identifications of the talkgroup and the requesting subscriber unit, which subscriber units within the talkgroup 101 are to be established as duplex participants of the talkgroup call, i.e., those subscriber units included in the sub-group 102. The table used to this end is further described relative to FIG. 3.

Figures 3, 5:
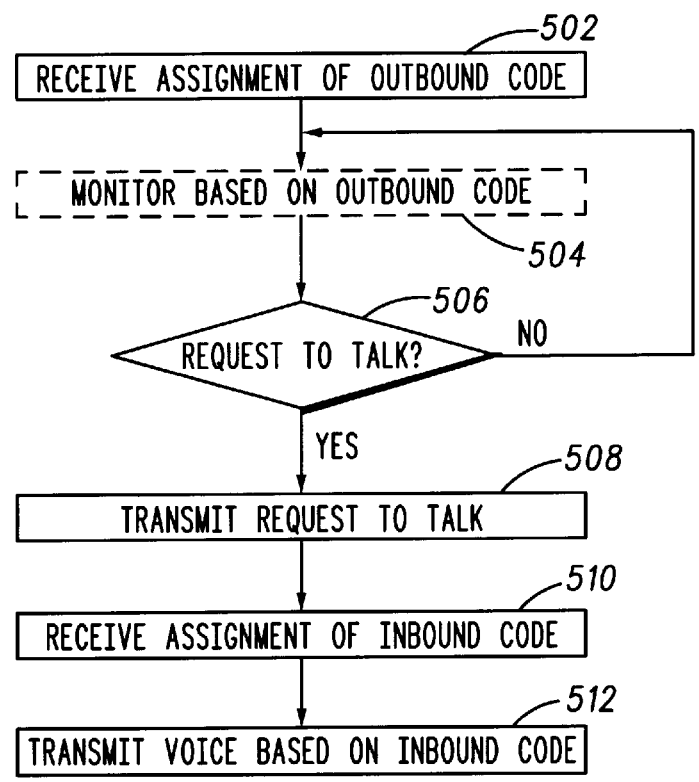
FIG. 3 illustrates a table for that may be incorporated when establishing a talkgroup call in accordance with the present invention.
FIG. 5 is a flow chart illustrating a method for use by a subscriber unit in accordance with the present invention.

FIG. 3 illustrates a table 300 that may be used by the fixed infrastructure 103 when establishing a talkgroup call. The table 300 comprises a series of entries 301–303 that correlate identifications of talkgroups 301 with the identifications of requesting subscriber units 302 and the sub-groups corresponding to each requesting subscriber unit 303. One benefit of this structure is that by changing the entries in the table 300, various configurations of sub-groups may be provided on a dynamic basis. Referring to the example shown in FIG. 3, the talkgroup identified as TG 001 includes subscriber units identified as SU 001, SU 002, SU 003, SU 004, SU 008, and SU 009. Thus, when subscriber unit SU 003 requests a talkgroup call, subscriber units SU 001, SU 002, SU 003, SU 004, SU 008, and SU 009 are included in the talkgroup, and subscriber units SU 001 and SU 008 are established as duplex sub-group members. Alternatively, when any of subscriber units SU 002, SU 004 or SU 009 requests a talkgroup call, subscriber units SU 001, SU 002, SU 003, SU 004, SU 008, and SU 009 are included in the talkgroup, and only subscriber unit SU 001 is established as a duplex sub-group member.

The data entered into the duplex sub-group entries 303 can be entered by a system manager, or it can be automatically entered as a dynamic function of various events. One manner of carrying out dynamic updates of the subgroup entries 303 is to continuously store identities of subscriber units that have recently engaged in communications with the requesting subscriber unit. That is, when one-to-one communications with a given unit are established, the sub-group entries can be updated to include the identity or identities of those subscriber units that participated in such one-to-one communications. Alternatively, any subscriber units that request to be added to a talkgroup call initiated by the requesting unit (described in further detail below) can be added to the appropriate sub-group entry. The time window for such "recent" communications is a matter of design choice and may be based on absolute time (e.g., only subscriber units that have communicated in the last X minutes) or sequence (e.g., only the last X subscriber units that have communicated). Another method is to update the sub-group entries 303 based on the relative priorities of subscriber units within the talkgroup. Thus, for any given subscriber unit, the sub-group only comprises those subscriber units within the talkgroup having a priority at least as high as the given unit. As priorities for subscriber units change, the sub-group entries 303 may be correspondingly updated. Yet another method is to update the sub-group entries 303 based on locations of subscriber units relative to each other. Thus, as a given subscriber unit updates its current location, the sub-group corresponding to that subscriber unit is updated to include only those subscriber units within a predetermined distance (e.g., one mile) of the given subscriber unit. Of course, other methods may be readily apparent to those having ordinary skill in the art. Additionally, other embodiments that achieve the same result as the table 300 may also used.

Returning to FIG. 2, having determined the talkgroup 101 and sub-group 102, the fixed infrastructure 103 assigns outbound and inbound codes to the talkgroup and sub-group, respectively. To this end, the fixed infrastructure 103, at step 206, determines an outbound code for use with the talkgroup 101 and at least one inbound code for use with the sub-group 102. The fixed infrastructure 103 may determine a single inbound code that is to be used by all members of the sub-group 102 or, preferably, separate inbound codes that are assigned to each member of the sub-group 102. The outbound code is used to create an outbound channel (often referred to as a downlink or forward channel) to each subscriber unit in the talkgroup 101. The at least one inbound code is used to create at least one inbound channel (often referred to as an uplink or reverse channel) for the members of the sub-group 102. The outbound code and at least one inbound code are announced to the talkgroup 101 at step 208. This announcement may be achieved using a control channel based on a PN code known to each subscriber unit, which control channel is monitored by the subscriber units.

Having made the code assignments, only those subscriber units included in the sub-group 102 may make inbound transmissions for the talkgroup call. Consequently, at step 210, the fixed infrastructure 103 receives streams of voice information from one or more subscriber units in the sub-group 102. Assuming that the at least two subscriber units within the sub-group 102 were assigned unique inbound codes, the streams of voice information received by the fixed infrastructure 103 may arrive concurrently, i.e., in a manner representative of normal group-style communications. Those units within the sub-group 102 not currently transmitting voice will transmit an idle pattern, as known in the art. At step 212, the fixed infrastructure 103 sums the streams of voice information to produce summed voice information. Various summing techniques may be used including, but not limited to, conference bridges or arithmetic addition within a signal processor. If the streams of voice information are in a form not suitable for summing, e.g., compressed digital voice, at least one interim transcoder, as known in the art, may be required to convert the streams of voice information into a format that is readily summed. Regardless of the summing method used, the summed voice information is then transmitted by the fixed infrastructure 103 using the outbound code. Because the outbound code is used, only the subscriber units within the talkgroup 101 will be able to receive and reproduce the summed voice information. Because the summed voice information is representative of multiple speakers, more realistic group communications are achieved.

The present invention anticipates that it may be necessary for subscriber units not currently members of the sub-group 102, and therefore unable to transmit voice information, to request the ability to transmit. Thus, at step 214, the fixed infrastructure 103 determines whether any subscriber units within the talkgroup 101, but not included in the sub-group 102, have transmitted a request to talk. The request to talk is transmitted on a channel based on a code other than one of the inbound codes assigned to the sub-group 102, i.e., a control channel. The request to talk includes identification of the talkgroup 101 and an identification of the subscriber unit requesting to talk. If such a request is received, the fixed infrastructure determines an additional inbound code, preferably unique from the previously assigned inbound code(s), at step 216. The additional inbound code is then announced to the requesting unit at step 208, and the talkgroup call proceeds as before, but with the addition of the requesting unit as a speaker in the call. As described above, the table discussed with regard to FIG. 3 may be updated to include the requesting unit (i.e., the unit that was assigned the additional inbound code) in the sub-group entry used to establish the current talkgroup call. The operation of a subscriber unit complementary to steps 214 and 216 is discussed relative to FIG. 5 below.

Assuming no requests to talk have been received at step 214, the fixed infrastructure 103 determines at step 218 whether the talkgroup call has ended. It is understood that various techniques may be employed to detect the end of the talkgroup call. For example, a time out timer may be used after all units have ceased transmitting either idle patterns or voice information. Alternatively, a detection that all subscriber units in the sub-group 102 have dekeyed could be used. Regardless, assuming that the talkgroup call has ended, the fixed infrastructure 103 de-assigns the outbound code and inbound codes at step 220. Similar to step 208, the de-assignment of the outbound and inbound codes can be performed over a control channel using known PN codes.

Figure 4:
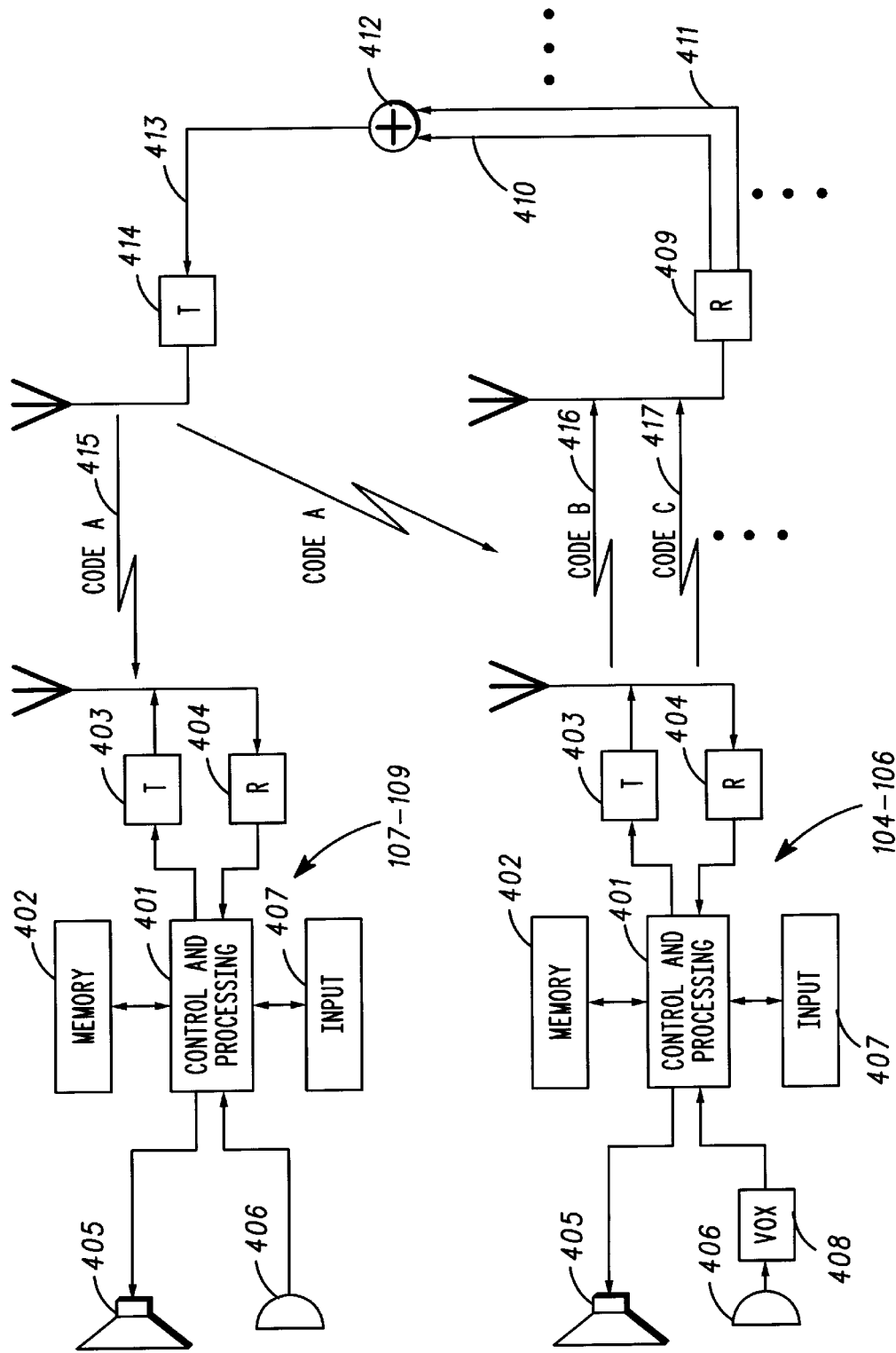
FIG. 4 is a block diagram illustrating operation of the wireless communication system of FIG. 1 in accordance with the present invention.

Operation of the present invention may be further described with reference to FIG. 4. In FIG. 4, the fixed infrastructure 103 is represented by a receiver 409 that provides separate streams of voice information 410–411 based on transmissions by the members of the sub-group 102, a summer 412 that sums the streams of voice information 410–411, and a transmitter 414 that transmits the summed voice information 413 to the talkgroup 101 using an outbound code 415 (labeled "Code A"). The transmissions by the members of the sub-group 102 are based on inbound codes 416–417 (labeled "Code B" and "Code C").

As shown in FIG. 4, each of the subscriber units 104–109 has a set of common elements. In particular, a control and processing element 401, which typically comprises a one or more processing devices (e.g., microprocessors, digital signal processors, etc.), is coupled to memory 402. The control and processing element 401 is coupled to a transmitter 403, receiver 404, speaker 405, microphone 406 and input device 407. Each of these elements are well-known in the art. Under control of software algorithms stored in the memory 402, the control and processing element 401 performs those tasks required for operation of the subscriber unit. The receiver 404 is used to receive assignments of outbound and/or inbound codes for use in talkgroup calls and, subsequently, to receive de-assignments of the outbound and/or inbound codes. Additionally, in all subscriber units included in the talkgroup 101, summed voice information 413, modulated according to the outbound code 415 and received via the receiver 404, is processed and provided to the speaker 405. In this manner, subscriber units included in the talkgroup 101 can monitor the outbound communications corresponding to the talkgroup call. The input device 407, which may comprise a keypad, menu-driven display or similar device, allows users to transmit requests to talk. In duplex subscriber units (i.e., members of the sub-group 102), speech input through the microphone 406 is processed and provided as a stream of voice information to the transmitter 403 for transmission based on an inbound code 416–417. The duplex subscriber units also make use of a voice-activated switching element (VOX) 408 such that a continuous stream of voice information (when speech is picked up by the microphone 406) or an idle pattern (when speech is not picked up by the microphone 406) is transmitted.

In the example of FIG. 4, two unique inbound codes, Code B and Code C, are used by subscriber units in the sub-group 102 to transmit streams of voice information 410–411. In practice, the inbound codes, Code B and/or Code C, are used not only to transmit inbound voice information, but may also be used to transmit power control information such that the fixed infrastructure 103 knows the status of the outbound code, Code A, in the areas where the duplex subscriber units are operating. That is, the fixed infrastructure 103 may adjust outbound transmitted power relative to Code A in order to maintain communications. Additionally, a single outbound code, Code A, is used to transmit the resulting summed voice information. In practice, the outbound code, Code A, is used not only to transmit the summed voice information 413, but may also be used to transmit control information, such as inbound code assignments and power control information, to members of the sub-group 102.

As described above, a subscriber unit that is a member of the talkgroup 101, but not a member of the sub-group 102, may transmit a request to talk to the fixed infrastructure 103 in order to participate in the talkgroup call. Operation of a subscriber unit to this end is further illustrated in FIG. 5. At step 502, a subscriber unit receives an assignment of an outbound code relative to a talkgroup call. As described above, such assignment is typically transmitted over a control channel established through the use of a known code.

At step 504, the subscriber unit may optionally monitor outbound communications relating to the talkgroup call. This step is optional in that a user of the subscriber unit may choose not to monitor the talkgroup call, or outbound communications may not be immediately forthcoming after receipt of the outbound code assignment. Regardless, at step 506, the subscriber unit detect a need to transmit a request to talk, which request is directed to the talkgroup call. After transmitting the request to talk to the fixed infrastructure 103 at step 508, the subscriber unit subsequently receives, from the fixed infrastructure 103, an assignment of an additional inbound code for use in the talkgroup call, at step 510. Having received the assignment, the subscriber unit can begin transmitting an additional stream of voice information using the inbound code at step 512. In this manner, any given subscriber unit may remain a listen-only participant or, if desired, alter its status to become an active participant (i.e., a speaker) in the talkgroup call.

The present invention generally provides a method and apparatus for duplex communications within talkgroups. Through the use of an efficient CDMA system resource allocation method, the present invention allows a sub-group of subscriber units to talk in a wireless duplex conference call while other members, potentially in a very large talkgroup, can listen and, if desired, join the call. In this manner, more natural, group-style communications can be achieved without placing an undue burden on the usage of wireless communication resources.

Although the present invention has been described with reference to certain preferred embodiments, numerous modifications and variations can be made by those skilled in the art without departing from the novel spirit and scope of the present invention.

We claim:

1. In a wireless code-division multiple access system comprising a plurality of subscriber units in wireless communication with a fixed infrastructure, a method for the fixed infrastructure to establish a talkgroup call, the method comprising steps of:

receiving, from a first subscriber unit of the plurality of subscriber units, a request for the talkgroup call, the request comprising an identity of the first subscriber unit and an identity of a talkgroup;

identifying, based on the identity of the talkgroup, a talkgroup of subscriber units comprising at least two subscriber units of the plurality of subscriber units;

identifying, based on the identity of the first subscriber unit, a sub-group of subscriber units of the talkgroup;

assigning an outbound code to the talkgroup; and assigning, in a one-to-one manner, at least one inbound code to the sub-group.

2. The method of claim 1, the step of identifying the talkgroup further comprising a step of indexing a table according to the identity of the talkgroup to select an entry uniquely associated with the identity of the talkgroup.

3. The method of claim 2, the step of identifying the sub-group further comprising a step of indexing the entry according to the identity of the first subscriber unit.

4. The method of claim 3, further comprising the step of identifying the sub-group that comprises stored identities of subscriber units of the talkgroup that have recently engaged in communications with the first subscriber unit.

5. The method of claim 3, further comprising the step of identifying the sub-group that comprises stored identities of subscriber units of the talkgroup having a priority level at least as high as the first subscriber unit.

6. The method of claim 3, further comprising the step of identifying the sub-group that comprise stored identities of subscriber units of the talkgroup having locations within a predetermined distance of the first subscriber unit.

7. The method of claim 1, further comprising steps of:

receiving, based on the at least one inbound code, streams of voice information from subscriber units of the sub-group;

summing the streams of voice information to produce summed voice information; and transmitting, based on the outbound code, the summed voice information to the talkgroup.

8. The method of claim 7, further comprising a step of de-assigning the outbound code and the at least one inbound code when the talkgroup call has ended.

9. The method of claim 7, further comprising steps of:

receiving, from a second subscriber unit of the talkgroup but not of the sub-group, a request to talk;

assigning an additional inbound code to the second subscriber unit;

receiving, based on the additional inbound code, an additional stream of voice information from the second subscriber unit; and summing the streams of voice information and the additional stream of voice information to produce the summed voice information.

10. The method of claim 9, further comprising a step of de-assigning the outbound code, the at least one inbound code and the additional inbound code when the talkgroup call has ended.

11. In a wireless code-division multiple access system comprising a plurality of subscriber units in wireless communication with a fixed infrastructure, a method for a subscriber unit of the plurality of subscriber units to participate in a talkgroup call, the method comprising steps of:

receiving, from the fixed infrastructure, an assignment of an outbound code associated with the talkgroup call;

transmitting, to the fixed infrastructure, a request to talk;

receiving, from the fixed infrastructure, an assignment of an inbound code associated with the talkgroup call wherein the inbound code enables the subscriber unit to transmit voice information concurrent with the transmission of voice information by another subscriber unit of the plurality of subscriber units; and transmitting, to the fixed infrastructure, a stream of voice information based on the inbound code.

12. The method of claim 11, further comprising a step of monitoring outbound communications of the talkgroup call based on the outbound code.

13. The method of claim 11, further comprising a step of receiving, from the fixed infrastructure, a de-assignment of the outbound code and the inbound code when the talkgroup call has ended.

14. A wireless code-division multiple access system comprising:

at least two subscriber units logically arranged into a talkgroup, the talkgroup further comprising a sub-group that is a subset of the talkgroup; and a fixed infrastructure, in wireless communication with the at least two subscriber units, that, upon receiving a request for a talkgroup call from a first subscriber unit of the at least two subscriber units, identifies the sub-group based on an identity of the first subscriber unit, assigns an outbound code to the talkgroup, and assigns at least one inbound code, in a one-to-one manner, to the sub-group.

15. The wireless code-division multiple access system of claim 14, the fixed infrastructure further comprising a controller.

16. The wireless code-division multiple access system of claim 14, the fixed infrastructure further comprising:

means for summing streams of voice information received, based on the at least one inbound code, from subscriber units of the sub-group to provide summed voice information; and a transmitter, operably coupled to the means for summing and in wireless communication with the talkgroup, to provide the summed voice information to the talkgroup based on the outbound code.

17. A subscriber unit for use in a wireless code-division multiple access system comprising a fixed infrastructure, the subscriber unit in wireless communication with the fixed infrastructure, the subscriber unit comprising:

means for receiving an assignment of an outbound code associated with a talkgroup call from the fixed infrastructure;

means for transmitting a request to talk to the fixed infrastructure;

means for receiving an assignment of an inbound code associated with the talkgroup call from the fixed infrastructure in response to the request to talk, wherein the inbound code enables the subscriber unit to transmit voice information concurrent with the transmission of voice information by another subscriber unit of the plurality of subscriber units; and means for transmitting a stream of voice information based on the inbound code to the fixed infrastructure.

18. The subscriber unit of claim 17, further comprising means for monitoring outbound communications of the talkgroup call based on the outbound code.

19. The subscriber unit of claim 17, further comprising means for receiving a de-assignment of the outbound code and the inbound code from the fixed infrastructure when the talkgroup call has ended.

* * * * *